US011114877B2

(12) United States Patent
Kikuchi et al.

(10) Patent No.: US 11,114,877 B2
(45) Date of Patent: Sep. 7, 2021

(54) BATTERY DEVICE AND VEHICLE

(71) Applicant: KABUSHIKI KAISHA TOSHIBA, Tokyo (JP)

(72) Inventors: Yusuke Kikuchi, Kawasaki (JP); Hidenori Suzuki, Tokorozawa (JP); Kazuto Kuroda, Tokyo (JP); Atsushi Inamura, Tokyo (JP); Masahiro Sekino, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/024,992

(22) Filed: Sep. 18, 2020

(65) Prior Publication Data

US 2021/0006084 A1 Jan. 7, 2021

Related U.S. Application Data

(63) Continuation of application No. PCT/JP2018/014147, filed on Apr. 2, 2018.

(51) Int. Cl.
*H02J 7/00* (2006.01)
*B60L 50/60* (2019.01)
(Continued)

(52) U.S. Cl.
CPC ............ *H02J 7/0063* (2013.01); *B60L 50/60* (2019.02); *B60L 58/14* (2019.02); *B60L 58/15* (2019.02);
(Continued)

(58) Field of Classification Search
CPC ..... Y02T 10/70; H02J 7/00306; H02J 7/0063; H02J 7/0047; B60L 2240/547; B60L 58/14; B60L 50/60; B60L 2240/545
See application file for complete search history.

(56) References Cited

U.S. PATENT DOCUMENTS

2006/0061922 A1\* 3/2006 Mihai ................... B60W 10/28
361/20
2009/0230923 A1\* 9/2009 Hoffman ............. H01M 6/5044
320/136
(Continued)

FOREIGN PATENT DOCUMENTS

JP 9-312937 A 12/1997
JP 2000-217210 A 8/2000
(Continued)

OTHER PUBLICATIONS

International Search Report dated May 1, 2018 in PCT/JP2018/014147filed Apr. 2, 2018, 2 pages.

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A device according to an embodiment includes at least one assembled battery; first switches that switch an electrical connection state of main circuits connected between the assembled battery and the load; second switches that switch an electrical connection state of second main circuits branched from the main circuits and are connected between the assembled battery and the load; a BMU that controls operations of the first switches based on an operation command supplied from the load; and a power supply circuit that supplies power to the BMU and second switches when a start command supplied from the outside is ON.

5 Claims, 3 Drawing Sheets

(51) Int. Cl.
  *B60L 58/15* (2019.01)
  *B60L 58/14* (2019.01)
(52) U.S. Cl.
  CPC ........ *H02J 7/0047* (2013.01); *H02J 7/00302* (2020.01); *H02J 7/00306* (2020.01); *B60L 2240/545* (2013.01); *B60L 2240/547* (2013.01)

(56) References Cited

U.S. PATENT DOCUMENTS

| | | |
|---|---|---|
| 2011/0115287 A1 | 5/2011 | Morita et al. |
| 2015/0188347 A1* | 7/2015 | Ruan .................... H02J 7/0063 320/118 |
| 2016/0181836 A1* | 6/2016 | Kanabe ................ H02J 7/0029 320/118 |
| 2017/0015205 A1 | 1/2017 | Ahn et al. |
| 2018/0191185 A1* | 7/2018 | Al Rasheed ............ B60L 58/13 |
| 2019/0081366 A1* | 3/2019 | Gyoda .................. H01M 10/44 |

FOREIGN PATENT DOCUMENTS

| | | |
|---|---|---|
| JP | 2010-284064 A | 12/2010 |
| JP | 2011-105205 A | 6/2011 |
| JP | 2013-76602 A | 4/2013 |
| JP | 2014-143799 A | 8/2014 |
| JP | 2017-163673 A | 9/2017 |

* cited by examiner

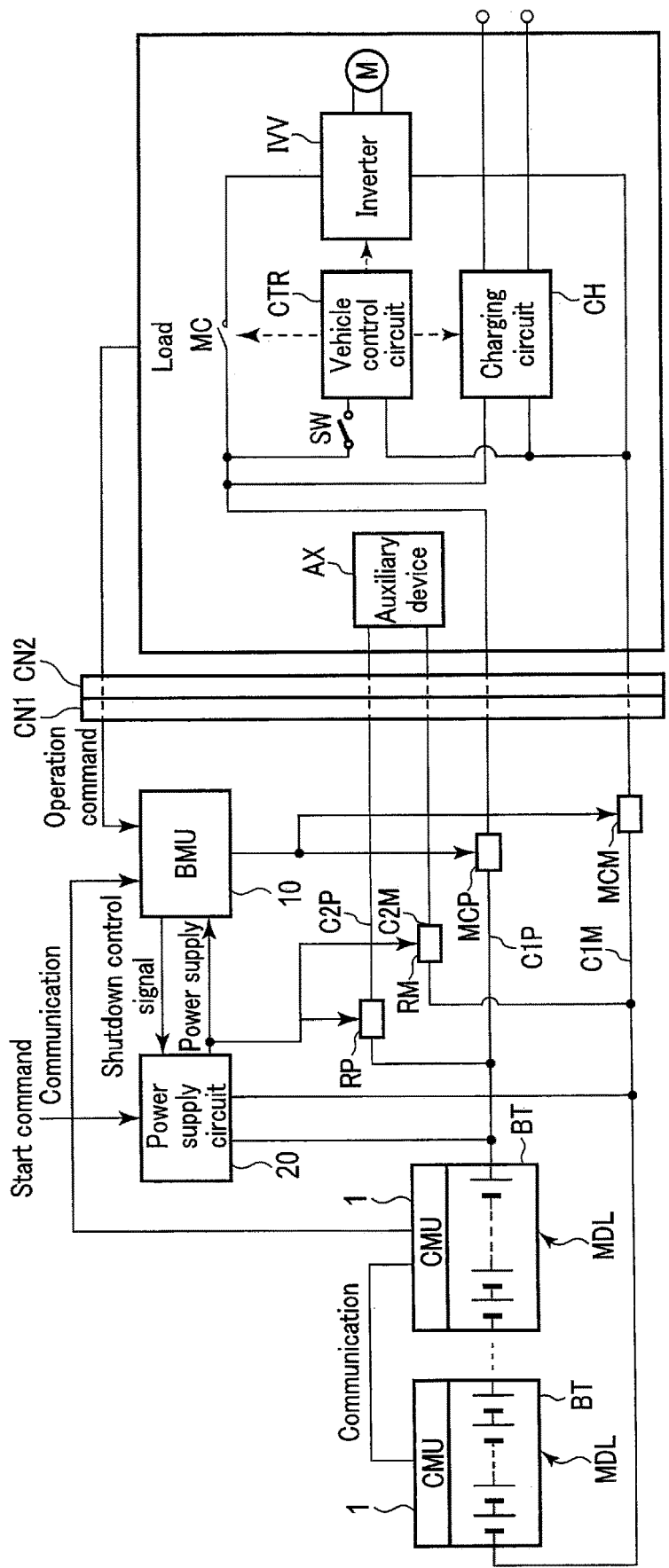
F I G. 1

| Start command | Operation command | Main contactor | Relay |
|---|---|---|---|
| OFF | ... | Open | Open |
| ON | OFF | Open | Close |
| ON | ON | Close | Close |

BATTERY DEVICE AND VEHICLE

CROSS REFERENCE TO RELATED APPLICATION

This application is a Continuation Application of PCT Application No. PCT/JP2018/014147, filed Apr. 2, 2018, the entire contents of which are incorporated herein by reference.

FIELD

Embodiments described herein relate generally to battery devices and vehicles.

BACKGROUND

In recent years, lithium ion batteries have been used as a power source for mobile objects, such as a portable electronic device and an electric vehicle, on account of characteristics such as their large charge capacity relative to weight. In addition, lithium ion batteries can shorten charging time due to their characteristic of having smaller resistance than other storage batteries, such as lead storage batteries. On the other hand, lithium ion batteries can generate a large current flow. Therefore, to maintain user safety, it is preferable not to energize the main circuit when a lithium ion battery is not connected to a load. Therefore, it is preferable to perform control on the battery device side such that the main circuit is energized only when the battery device and a load are normally connected.

In addition, in an electronic apparatus that employs a battery device including a lithium ion battery as a power source, several hundred amperes of current may flow through the main circuit during both operation of the electronic apparatus and charging of the lithium ion battery. Therefore, in the battery device, the electrical connection of the main circuit is configured to be switched by, for example, an electromagnetic contactor.

When an electronic apparatus is started, a situation is assumed in which it is necessary to obtain power supply from a battery device, even when an operation requiring a large current is not performed. When such a load is connected to a power supply device, for example, in a case where a path through which power is supplied from a battery device to the load is a path that only supplies a large current, the electrical connection of the main circuit is interrupted during a time when the load does not require a large current, and necessary power may not be supplied to the load. That is, it is possibly the case that load devices capable of mounting conventional power supply devices have been limited.

BRIEF DESCRIPTION OF THE DRAWINGS

FIG. 1 is a diagram schematically illustrating a configuration example of a battery device and a vehicle according to an embodiment.

DETAILED DESCRIPTION

Figures 2, 3:
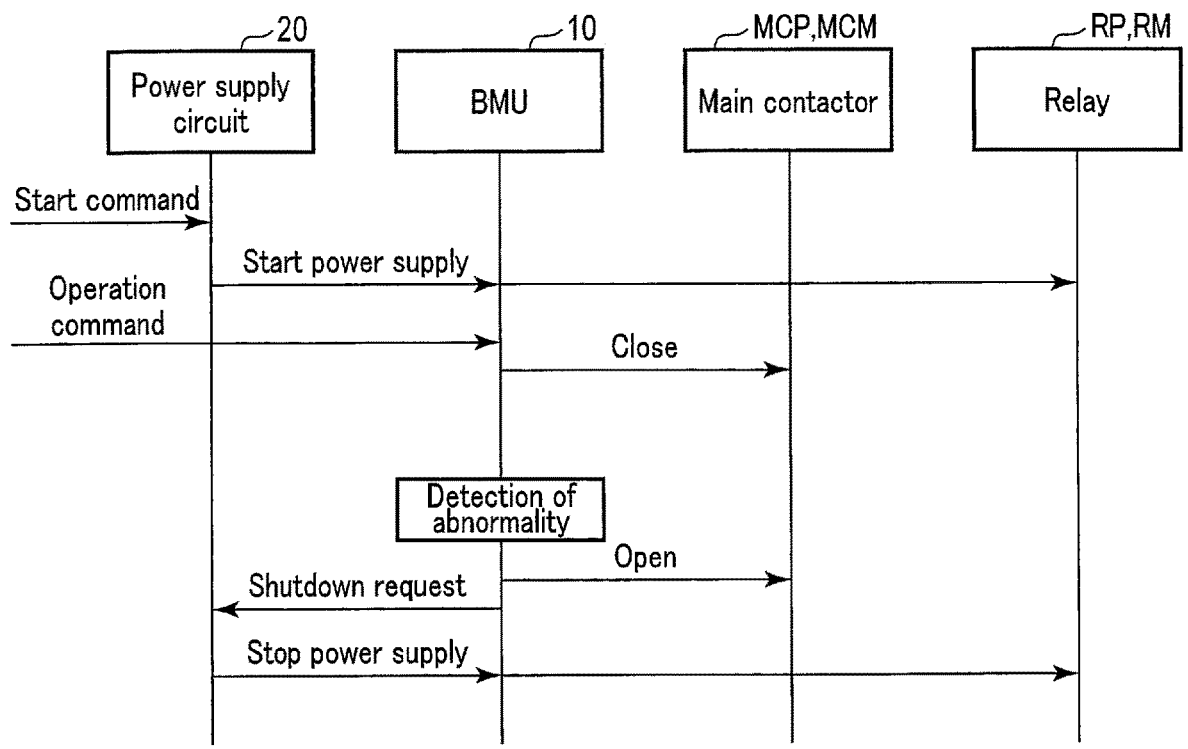
FIG. 2 is a timing chart for explaining an example of the operation of the battery device and the vehicle illustrated in FIG. 1.
FIG. 3 is a diagram for explaining an example of a command supplied from the outside and a connection state of a main circuit in the battery device illustrated in FIG. 1.

A battery device according to an embodiment includes at least one assembled battery; a first main switch that switches an electrical connection state of a main circuit connected between the assembled battery and a load; a second main switch that switches an electrical connection state of a second main circuit branched from the main circuit and connected between the assembled battery and the load; a battery management circuit that controls an operation of the first main switch based on an operation command supplied from the load; and a power supply circuit that supplies power to the battery management circuit and the second main switch when a start command supplied from the outside is ON.

Hereinafter, the battery device and the vehicle according to an embodiment will be described with reference to the drawings.

In the following embodiment, an industrial vehicle and a battery device mounted on the industrial vehicle will be described by way of example. For example, a vehicle is required to be able to operate auxiliary devices (a blinker, a horn, and the like) even when the vehicle is not being driven. For this reason, the vehicle may discharge on the order of 10 amperes at the maximum even when the vehicle stops driving, and it has been necessary to configure the battery device to be able to discharge.

However, when a state in which the main circuit and the load are connected continues for a long period of time, power is consumed from the battery device to close the electromagnetic contactor, and the battery device may enter an over-discharge state. For example, an industrial vehicle may be in a state in which it is not being driven and the battery device is not charged over a long period of time. When the state in which the vehicle is not being driven and the battery device is not charged continues in the state where the main circuit is electrically connected, power is consumed from the battery device to close the electromagnetic contactor, leading to an over-discharge state of the battery device, and difficulties in ensuring safety.

In the following embodiment, a description will be given of an example of a battery device having high versatility and capable of supplying power to auxiliary devices even when a vehicle is not driven, and a vehicle equipped with this battery device.

FIG. 1 is a diagram schematically illustrating a configuration example of a battery device and a vehicle according to an embodiment.

The vehicle of the present embodiment is an electric vehicle including a battery device, a connector CN2, a vehicular control circuit CTR, a charging circuit CH, an inverter INV, an electric motor M, a main switch MC, a switch SW, and an auxiliary device AX.

The charging circuit CH can be electrically connected to the main circuits C1P, C1M of the battery device via connectors CN1, CN2. The charging circuit CH can supply charging current to a plurality of battery modules MDL via the main circuits C1P, C1M of the battery device when electrically connected to a charging terminal exposed to the outside and when a charging device is connected to the charging terminal.

The DC terminals of the inverter INV can be electrically connected to the main circuits C1P and C1M of the battery device via the connectors CN1, CN2. An AC terminal of the inverter INV is electrically connected to the electric motor M. The inverter INV can convert DC power obtained from the battery device into AC power and output it to the electric motor M. Furthermore, the inverter INV can convert AC power obtained from the electric motor M into DC power and output it to the battery device. The electrical connection state between the DC terminals of the inverter INV and the main circuits C1P, C1M of the battery device can be switched by a main contactor MC.

The auxiliary device AX can be electrically connected to the second main circuits C2P, C2M of the battery device via connectors CN1, CN2. The auxiliary device AX is, for example, an accessory device necessary for putting the main machine into action, and includes, for example, a blinker and a horn.

The vehicle control circuit CTR is configured to be able to control operations of the charger CH, the inverter INV, the main contactor MC, and the auxiliary device AX. The vehicle control circuit CTR may include, for example, at least one processor such as a central processing unit (CPU) or a micro processing unit (MPU), and a memory that stores a program executed by the processor.

The vehicle control circuit CTR is electrically connected to the main circuits C1P, C1M of the battery device via the connectors CN1, CN2, and uses DC power supplied from the battery device as a power source. On a power supply line of the vehicle control circuit CTR, for example, a switch SW, whose electrical connection state is switched by an ignition signal, is provided. When the user activates the ignition of the vehicle, power is supplied from the battery device to the vehicle control circuit CTR.

The battery device of the present embodiment includes a plurality of battery modules MDL, a battery management circuit (BMU) 10, a power supply circuit (DC/DC) 20, main switches (main contactors) MCP, MCM, and relays (second main switches) RP, RM. The battery device of the present embodiment has, for example, a nominal voltage of less than 100V, allowing for the battery device to be mounted on industrial vehicles such as forklifts.

The battery device of the present embodiment can be connected to a load via a first connector CN1 electrically connected to the main circuits C1P, C1M of the battery device by main switches MCP, MCM or relays RP, RM, and a second connector CN2 electrically connected to the load. It should be noted that the battery device of the present embodiment may include the first connector CN1.

Each plurality of battery modules MDL includes, for example, an assembled battery BT containing a plurality of secondary battery cells connected in series and/or in parallel. In addition, each plurality of battery modules MDL may include a temperature sensor, a protection element (protection device) such as a fuse, and a battery monitoring circuit (CMU: Cell Monitoring Unit) 1. The battery monitoring circuit 1 may be included in a battery management circuit 10 to be described later.

The plurality of battery modules MDL of the assembled battery BT are connected in series via, for example, a disconnector (service disconnect) (not shown).

In the present embodiment, the assembled battery BT includes a plurality of secondary battery cells of lithium ion batteries (not shown). The secondary battery cells of the assembled battery BT are not limited to lithium ion batteries, and secondary batteries, such as nickel-hydrogen batteries, nickel-cadmium batteries, can be used.

The battery monitoring circuit 1 detects a voltage between a positive electrode terminal and a negative electrode terminal of each plurality of secondary battery cells of the assembled battery BT. Also, the battery monitoring circuit 1 detects the temperature in the vicinity of the assembled battery BT from at least one location.

The battery monitoring circuit 1 is configured to be able to communicate with the battery management circuit 10 and another battery monitoring circuit 1, which will be described later, based on, for example, the control area network (CAN) protocol. The battery monitoring circuit 1 periodically transmits information on the detected voltage and temperature to the battery management circuit 10. For example, the detected values may be sequentially transmitted from a battery monitoring circuit 1 of a battery module MDL, on the lower potential side, to a battery monitoring circuit of a battery module MDL on the higher potential side, and all detected values of the assembled battery BT may be transmitted from a battery monitoring circuit of the highest potential side to the battery management circuit 10. Each battery monitoring circuit 1 of the plurality of battery modules MDL may be communicatively connected to the battery management circuit 10 so that the detected values are transmitted from each plurality of battery monitoring circuits 1 to the battery management circuit 10.

The battery monitoring circuit 1 may include, for example, at least one processor and a memory, and be configured to realize the above-mentioned operation by software. It may also be configured to realize the above-mentioned operation by a circuit composed of hardware, or by a combination of software and hardware.

The main switches MCM, MCP are provided in the main circuit so as to be able to switch the electrical connection state of the main circuit connected between the plurality of battery modules MDL and the load. The main switch MCP switches the electrical connection state of the main circuit extending between a positive electrode terminal of the battery module MDL, on the highest potential side and the load. The main switch MCM switches the electrical connection state of the main circuit extending between the negative electrode terminal of a battery module MDL, on the lowest potential side, and the load.

As the main switches MCP, MCM, a contactor of an A contact, which is a normally-open electromagnetic contactor (including an FET, a relay, and the like), can be adopted.

Further, in the present embodiment, the main switch MCP is provided in the main circuit C1P on the high potential side, and the main switch MCM is provided in the main circuit C1M on the low potential side to ensure security. However, at least one of the main switches MCP, MCM may be provided.

The battery management circuit 10 is communicatively connected to a load via the connectors CN1 and CN2. The battery management circuit 10 closes the main switches MCP and MCM to electrically connect the main circuits C1P and C1M to the load, for example when an operation command received from the load is the on state. The operation command is, for example, a signal indicating ON when an ignition (or a seat switch) of an industrial vehicle is turned on, and indicating OFF when the ignition (or the seat switch) is turned off.

The battery management circuit 10 is configured to be able to communicate with the battery monitoring circuit 1. The battery management circuit 10 acquires information on the voltages of the secondary battery cells and the temperature of the assembled battery BT from the battery monitoring circuits 1 of the plurality of battery modules MDL. In addition, the battery management circuit 10 acquires, from a current sensor (not shown), information on current flowing through the plurality of assembled batteries BT. The current sensor is disposed, for example, between the positive electrode terminal of the battery module MDL on the highest potential side and the main switch MCP. The current sensor periodically detects current flowing through the plurality of assembled batteries BT and transmits the detected result to the battery management circuit 10. The battery management circuit 10 can calculate the state of charge (SOC) of the plurality of assembled batteries BT (or secondary battery cells) by using, for example, information on voltage, temperature, and current.

Further, the battery management circuit 10 can disconnect the electrical connection between the main circuits C1P, C1M by the main switches MCP, MCM; stop the charging (or discharging) of the assembled batteries BT; and output an alarm which notifies an exchange timing of a assembled battery, an alert for notifying abnormality, and the like, in accordance with, for example, the voltages of the secondary battery cells, the temperature of the assembled batteries BT, and the calculated SOC.

The battery management circuit 10 is started by power supplied from the power supply circuit 20. In addition, the battery management circuit 10 can transmit a shutdown control signal to the power supply circuit 20 to stop its own power supply, for example when it detects abnormality of the plurality of battery modules MDL.

The battery monitoring circuit 10 may include, for example, at least one processor and a memory, and be configured to realize the above-mentioned operation by software. It may also be configured to realize the above-mentioned operation by a circuit composed of hardware, or by a combination of software and hardware.

The power supply circuit 20 is started, for example, by a start command notified by turning on a starting switch (not illustrated). The power supply circuit 20 includes a DC-DC circuit that converts a DC voltage (e.g., 24V) supplied from the main circuits C1P, C1M into a predetermined DC voltage (e.g., 12V), and is configured to be able to supply power of a converted predetermined DC voltage (e.g., 12V) to the battery management circuit 10 and the relays RP, RM.

For example, the wiring for supplying power from the power supply circuit 20 to the battery management circuit 10, and the wiring for supplying power from the power supply circuit 20 to the relays RP, RM both include a common power supply wiring and branch wirings branched from the common power supply wiring to the respective components. Therefore, power is simultaneously supplied to the relays RP, RM at the timing when power is supplied from the power supply circuit 20 to the battery management circuit 10, and power supply to the relays RP, RM is simultaneously stopped at the timing when the power supply from the power supply circuit 20 to the battery management circuit is stopped.

The power supply circuit 20 receives power supplied from the main circuits C1P, C1M extending between the main switches MCP, MCM and the plurality of battery modules MDL. Therefore, even when the main switches MCP and MCM are open, power can be supplied from the plurality of battery modules MDL to the power supply circuit 20.

The relays RP, RM are branched from the main circuits C1P, C1M, and are provided so as to switch the electrical connection state of the second main circuits C2P, C2M connected between the plurality of battery modules MDL and the auxiliary device of the load. The second main circuits C2P, C2M are branched from the main circuits C1P, C1M extending between the main switches MCP, MCM and the plurality of battery modules MDL. The relays RP, RM are, for example, solid state relays (SSR) of normally open type and characterized by consuming less current than the main switches MCP, MCN. The relays RP, RM close the second main circuits C2P, C2M when power is supplied from the power supply circuit 20, and open the second main circuits C2P, C2M when power supply from the power supply circuit 20 is stopped.

FIG. 2 is a timing chart for explaining an example of the operation of the battery device illustrated in FIG. 1.

FIG. 3 is a diagram for explaining an example of a command supplied from the outside and a connection state of a main circuit in the battery device illustrated in FIG. 1.

In the battery device of the present embodiment, when the start command is OFF, the power supply circuit 20 is in a stopped state, and the main switches (main contactors) MCP, MCM and the relays RP, RM are in an open state.

When the battery device is started, for example, a user operates a starting switch to turn it on, and transmits a start command to the power supply circuit 20. The power supply circuit 20 is started by receiving the start command, and starts power supply to the battery management circuit 10 and the relays RP, RM. The relays RP, RM electrically connect the second main circuits C2P, C2M through being supplied with power, and the plurality of battery modules MDL are electrically connected to the auxiliary device of the load via the main circuits C1P, C1M and the second main circuits C2P, C2M. That is, when the start command is ON and the operation command is OFF, the main switches (main contactors) MCP, MCM are in the open state, and the relays RP and RM are in the closed state.

Subsequently, when the battery management circuit 10 receives an operation command from the load, the battery management circuit 10 closes the main switches (main contactors) MCP, MCM. Therefore, when the start command is ON and the operation command is ON, the main switches (main contactors) MCP, MCM and the relays RP, RM are in the closed state.

In this state, for example, when the battery management circuit 10 detects an abnormality such as over-charging or over-discharging of a battery module MDL, it opens the main switches (main contactors) MCP, MCM to electrically disconnect the main circuits C1P, C1M from the load, thereby stopping charging and discharging. Subsequently, the battery management circuit 10 makes a shutdown request to the power supply circuit 20 to stop power supply to the battery management circuit 10 and the relays RP, RM. When the power supply from the power supply circuit 20 is stopped, the battery management circuit 10 is stopped, the relays RP and RM are opened, and the power supply from the battery device to the auxiliary device is also stopped.

As described above, the battery device of the present embodiment is provided with the main circuit that supplies power from the battery device to a load and the second main circuits C2P, C2M branched from the main circuits C1P, C1M, and controls the main circuits C1P, C1M and the second main circuits C2P, C2M, respectively, in an independent fashion.

Further, the electrical connection state of the main circuit is switched by a control signal from the battery management circuit 10, and the electrical connection state of the second main circuit is controlled by the power supply from the power supply circuit 20 so as to operate simultaneously with the power supply to the battery management circuit 10. Therefore, only one control system of the battery management circuit 10 is required, and it is not necessary to provide a plurality of control systems in the battery management circuit 10.

According to the battery device of the present embodiment, at a timing other than when the battery management circuit 10 is stopped (for example, when the connector CN1 and the connector CN2 are not connected to each other, or an abnormality of a battery module MDL is detected), power can be supplied to the auxiliary device regardless of the connection state of the main switches MCP, MCM.

That is, when a load stops operating and there is no need to supply a large current to the load, power can be supplied to the load through a path that does not pass through the main switches MCP, MCM, and the power stored in the plurality of battery modules MDL is not consumed by the main switches MCP and MCM. Therefore, in a period in which the operation of the load is stopped, when the battery management circuit 10 detects an abnormality, such as over-charging or over-discharging of a battery module MDL even in this state, a shutdown request is issued to the power supply circuit 20 to stop the power supply to the battery management circuit 10 and the relays RP, RM. When the power supply from the power supply circuit 20 is stopped, the battery management circuit 10 is stopped, the relays RP, RM are opened, and the power supply from the battery device to the auxiliary device is also stopped. As described above, according to the present embodiment, a battery device which ensures safety can be provided.

Figure 4:
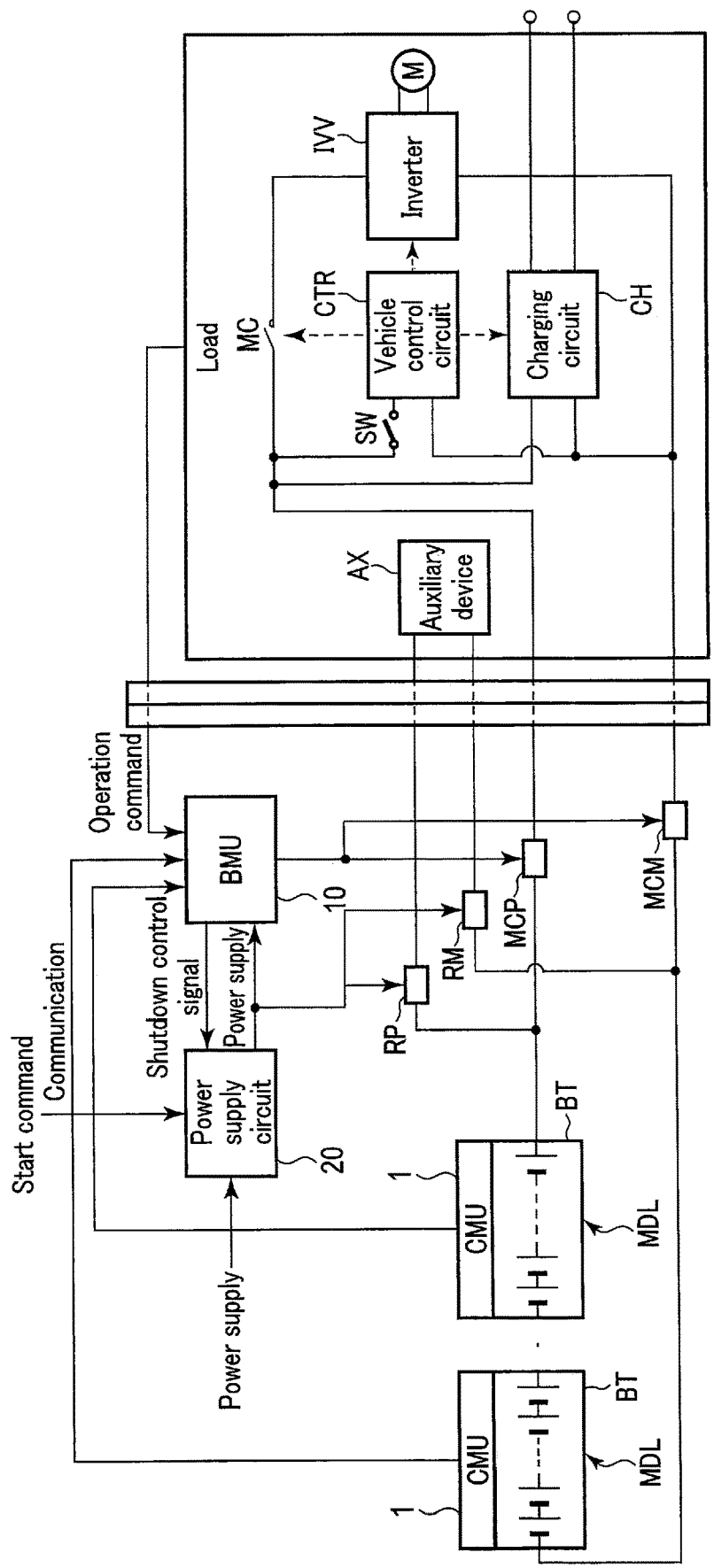
FIG. 4 is a diagram schematically illustrating another configuration example of the battery device and the vehicle according to the embodiment.

Although the power supply circuit 20 is supplied with power from the main circuits C1P, C1M in the example illustrated in FIG. 1, the power supply circuit 20 may be supplied with power from the outside as illustrated in FIG. 4, for example. Even in this case, the same advantageous effects as those of the above-described embodiment can be obtained.

In addition, in the above-described embodiment, an industrial vehicle is described as an example of the vehicle, but it is needless to say, the battery device of the present embodiment can be mounted on a vehicle other than industrial vehicles. For example, the battery device according to the above-described embodiment can be mounted on various electric vehicles such as a vehicle used for track-based transportation, for example, a monorail and a railroad, an automatic guided vehicle (AGV), a passenger car, and a large passenger car. Furthermore, the above-described battery device can also be employed as a power source for electronic devices other than electric vehicles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A battery device comprising:
    at least one assembled battery;
    a first main switch that switches an electrical connection state of a main circuit connected between the assembled battery and a load;
    a second main switch that switches an electrical connection state of a second main circuit which is branched from the main circuit and connected between the assembled battery and the load;
    a battery management circuit that controls an operation of the first main switch based on an operation command supplied from the load; and
    a power supply circuit that supplies power to the battery management circuit and the second main switch when a start command supplied from the outside is ON.

2. The battery device according to claim 1, further comprising:
    a battery monitoring circuit that detects a voltage and a temperature of the assembled battery and transmits them to the battery management circuit,
    wherein the battery management circuit is configured to determine whether or not the assembled battery is normal based on information of the voltage and temperature obtained from the battery monitoring circuit, and is configured, when it determines that the assembled battery is abnormal, to transmit a shutdown control signal to the power supply circuit, and
    wherein the power supply circuit is configured, when it receives the shutdown control signal, to stop power supply to the battery management circuit and the second main switch.

3. The battery device according to claim 2, wherein the first main switch is an electromagnetic contactor, and the second main switch is a solid state relay.

4. The battery device according to claim 1, wherein the first main switch is an electromagnetic contactor, and the second main switch is a solid state relay.

5. A vehicle comprising:
    the battery device according to claim 1;
    an inverter electrically connected to the main circuit of the battery device; and
    the load comprising an auxiliary device being electrically connected to the second main circuit of the battery device, and an electric motor driven by power supplied from the inverter.

* * * * *